(12) United States Patent
Tsukagoshi

(10) Patent No.: US 11,394,984 B2
(45) Date of Patent: Jul. 19, 2022

(54) TRANSMISSION DEVICE, TRANSMISSION METHOD, RECEPTION DEVICE, AND RECEPTION METHOD

(71) Applicant: SONY CORPORATION, Tokyo (JP)

(72) Inventor: Ikuo Tsukagoshi, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 17/163,964

(22) Filed: Feb. 1, 2021

(65) Prior Publication Data

US 2021/0160517 A1 May 27, 2021

Related U.S. Application Data

(63) Continuation of application No. 16/549,024, filed on Aug. 23, 2019, now Pat. No. 11,122,280, which is a
(Continued)

(30) Foreign Application Priority Data

Mar. 7, 2014 (JP) .................................. 2014-045763

(51) Int. Cl.
*H04N 19/30* (2014.01)
*H04N 21/2343* (2011.01)
(Continued)

(52) U.S. Cl.
CPC .......... *H04N 19/30* (2014.11); *H04N 19/188* (2014.11); *H04N 19/70* (2014.11);
(Continued)

(58) Field of Classification Search
None
See application file for complete search history.

(56) References Cited

U.S. PATENT DOCUMENTS 6,009,236 A 12/1999 Mishima et al.
6,233,356 B1 5/2001 Haskell
(Continued)

FOREIGN PATENT DOCUMENTS

EP 1 869 888 12/2007
JP 8-223531 A 8/1996
(Continued)

OTHER PUBLICATIONS

Haque, M., ei al., "On HEVC descriptors for Temporal sub-streams with a single PID in a MPEG-2 Transport Stream", 101 MPEG Meeting; Jul. 16, 2012-Jul. 20, 2012; Stockholm; (Motion Picture Expert Group or ISO/IEC JTC1/SC29/WG11) XP030054519, Jul. 2012, 8 pages.
(Continued)

*Primary Examiner* — Tyler W. Sullivan
(74) *Attorney, Agent, or Firm* — Oblon, McClelland, Maier & Neustadt, L.L.P.

(57) ABSTRACT

An image data of pictures constituting moving image data is encoded to generate an encoded video stream. In this case, the image data of the pictures constituting the moving image data is classified into a plurality of levels and encoded to generate a video stream having the image data of the pictures at the respective levels. Hierarchical composition is equalized between a low-level side and a high-level side, and corresponding pictures on the low-level side and the high-level side are combined into one set and are sequentially encoded. This allows a reception side to decode the encoded image data of the pictures on the low-level side and the high-level side with a smaller buffer size and a reduced decoding delay.

18 Claims, 15 Drawing Sheets

Related U.S. Application Data continuation of application No. 15/119,582, filed as application No. PCT/JP2015/054090 on Feb. 16, 2015, now Pat. No. 10,455,243.

(51) Int. Cl.
  *H04N 21/4402* (2011.01)
  *H04N 21/854* (2011.01)
  *H04N 19/70* (2014.01)
  *H04N 19/169* (2014.01)

(52) U.S. Cl.
  CPC ............. *H04N 21/234327* (2013.01); *H04N 21/234381* (2013.01); *H04N 21/440227* (2013.01); *H04N 21/85406* (2013.01)

(56) References Cited

U.S. PATENT DOCUMENTS

| | | | |
|---|---|---|---|
| 9,538,211 | B2 | 1/2017 | Tsukagoshi |
| 9,591,316 | B2* | 3/2017 | Bar Bracha ............ H04N 19/36 |
| 9,819,976 | B2 | 11/2017 | Tsukagoshi |
| 9,838,702 | B2* | 12/2017 | Lee ........................ H04N 19/51 |
| 10,306,296 | B2 | 5/2019 | Tsukagoshi |
| 2002/0051581 | A1 | 5/2002 | Takeuchi et al. |
| 2004/0022322 | A1 | 2/2004 | Dye |
| 2005/0083401 | A1 | 4/2005 | Mizutani et al. |
| 2009/0110073 | A1 | 4/2009 | Wu |
| 2010/0027615 | A1 | 2/2010 | Pandit |
| 2011/0097059 | A1 | 4/2011 | Sekiguchi |
| 2013/0279600 | A1 | 10/2013 | Toma |
| 2014/0232623 | A1 | 8/2014 | Tsukagoshi |
| 2015/0110167 | A1 | 4/2015 | Chen |
| 2015/0245046 | A1 | 8/2015 | Tsukuba |
| 2015/0256856 | A1 | 9/2015 | Tsukuba |
| 2016/0119632 | A1 | 4/2016 | Lee |
| 2016/0191926 | A1 | 6/2016 | Deshpande |
| 2016/0191932 | A1 | 6/2016 | Toma |
| 2016/0212437 | A1 | 7/2016 | Tsukuba |
| 2016/0295257 | A1 | 10/2016 | Iguchi |
| 2020/0359044 | A1* | 11/2020 | Yuzawa ................ H04N 19/30 |

FOREIGN PATENT DOCUMENTS

| | | |
|---|---|---|
| JP | 2001-16582 A | 1/2001 |
| JP | 2002-10251 A | 1/2002 |
| JP | 2013-90016 | 5/2013 |
| JP | 5774652 B2 | 7/2015 |
| JP | 5789004 B2 | 8/2015 |
| WO | WO 03/075524 A1 | 9/2003 |
| WO | WO 2006/109117 A1 | 10/2006 |
| WO | WO 2013/054775 A1 | 4/2013 |
| WO | WO 2013/157826 A1 | 10/2013 |
| WO | WO 2014/002914 A1 | 1/2014 |
| WO | WO 2014/007550 A1 | 1/2014 |

OTHER PUBLICATIONS

"Signalling of level". DVB, Digital Video Broadcasting, XP017842548, Feb. 2014, 10 pages.
1 Office Action dated Jan. 29, 2019 in Japanese Application No. 2018-106751.
Office Action dated Oct. 24, 2017 in Japanese Patent Application No. 2016-223017 (with English language translation).
Tomoyuki Yamamoto. "1-7 HEVC Profile/level and Extensions", Technology Trend of the New Video/Image Coding, The Journal of The Institute of Image Information and Television Engineers. vol. 67, No. 7, 2013, pp. 553-556 and cover pages.
Office Action dated Jun. 16, 2019 in corresponding Japanese Patent Application No. 2016-108751, 5 pages.
International Search Report dated Apr. 7, 2015 in PCT/JP2015/0054090.
Japanese Office Action dated Jul. 5, 2016 in Patent Application No. 2015-232606.
Japanese Office Action dated Jul. 5, 2016 in Patent Application No. 2015-232609.
Sam Narasimhan, et al, "Consideration of Buffer Management Issued HEVC Scalability" Joint Collaborative Team on Video Coding (JCT-VC) of ITU-T SG 16 WP 3 and ISO/IEC JTC 1/SC 29/WG 11, JCTVC-N0049, 2013, pp. 1-6.
"Combined PDAM Registration and PDAM Consideration Baliot on ISO/IEC 13818-1:201X/PDAM3: Information Technology—Generic Coding of Moving Pictures and Associated Audio Information: Systems Amendment 3: Transport of HEVC Video Over MPEG-2 Systems [SC 29WG 11 N 12637]" ISO/IEC JTC 1/SC 29 N 12806, May 24, 2012, pp. 5, 1/2-2/2.
Benjamin Bross et al, "High Efficiency Video Coding (HEVC) Text Specification Draft 9" Joint Collahorative Team on Video Coding (JCT-VC) of ITU-T SG16 WP3 and ISO/IEC JTC1/SC29/WG11, JCTVC-K1003_v13, Oct. 2012, pp. 30-32, 36, 73-74.
Gary J. Sullivan, et al., "Overview of the High Efficiency Video Coding (HEVC) Standard" IEEE Transactions on Circuits and Systems for Video Technology, vol. 22, No. 12, Dec. 2012, pp. 1649-1668.
Shuichi Acki, et al., "A Study on MMT for Hybrid Delivery on Broadcast and Broadband" IPSJ SIG Technical Report. vol. 2014-AVM-84 No. 2, Feb. 21, 2014, pp. 1-13 and 1-6 with English translation.
"Text of ISO/IEG 13818-1:201X/FDAM 3: Information Technology—Generic Coding of Moving Pictures and Associated Audio Information: Systems, Amendment S: Transport of HEVC Video Over MPEG-2 systems [SC 29/WG 11 N 13656]" ISO/IEC JTC 1/SC 29/WG 11 N 13760, Sep. 6, 2013, 3 Pages.
Kazushi Sato, "SHVC: On Inter-Layer Prediction" Joint Collaborative Team on Video Coding (JCT-VC,) of ITU-T SG16 WP3 and ISO/IEC JTC 1/SC 29/WG 11 JCTVC-L0278r2, Jan. 15, 2013, pp. 1-5.
"High Efficiency Video Coding" ITU-T Telecommunication Standardization Sector of ITU. H.265, Apr. 2013, pp. 37, 72-74. 200-206 and Cover page.
"Information Technology—Generic Coding of Moving Plethres and Associated Audio Information: Systems Amendment 3: Transport of HEVC video over MPEG-2 systems" ITU-T Telecommunication Standartization Sector of ITU, H.222.0, Jan. 2014. pp. 6-7 and Cover page.
"information Technology—Generic Coding of Moving Pictures and Associated Audio Information: Systems Amendment 3" ISO/IEC 13818-1:201X;PDAM 3 (E), Rec. ITU-T H. 222.0/Amd.3, Jan. 2014, pp. 1-9 and Cover page.
Benjamin Bross et al., "High Efficiency Video Coding (HEVC) Text Specification Draft 9" Joint Collaborative Team on Video Coding (JCT-VC) of ITU-T SG16 WP3 and ISO/IEC JTC1/SC29/WG11, JCTVC-K1003_v13. Oct. 2012. pp. i-xxiii. 1-293.

\* cited by examiner

```
nal_unit_header( ) {                    Descriptor
    forbidden_zero_bit                  f(1)
    nal_unit_type                       u(6)
    nuh_layer_id                        u(6)
    nuh_temporal_id_plus1               u(3)
}
```

*FIG. 4A*

Semantics

Forbidden_zero_bit            (1bit)
    VALUE IS ESSENTIALLY 0.
Nal_unit_type            (6bits)
    VALUE IS DECIDED FOR EACH OF FOLLOWING NAL units:

| AUD | VPS | SPS | PPS | PSEI | SLICE | SSEI | EOS |

Nuh_layer_id            (6bits)
    VALUE IS 0 AS PRECONDITION.
Nuh_temporal_id_plus1 (3bits)
    INDICATE temporal_id. TAKE VALUE INCREASED BY 1 (1 TO 6).
    VALUE OF temporal_id IS 0 TO 5.

FIRST PICTURE OF GOP: AUD | VPS | SPS | PPS | PSEI | SLICE | SSEI | EOS

PICTURES OTHER THAN FIRST PICTURE OF GOP: AUD | PPS | PSEI | SLICE | SSEI | EOS

FIG. 7A

Layer_decoding_descriptor Syntax

| Syntax | No. of Bits | Format |
|---|---|---|
| Layer_decoding_descriptor() { | | |
|   Layer_decoding_descriptor_tag | 8 | uimslbf |
|   Layer_decoding_descriptor_length | 8 | uimslbf |
|   layer_information() | | |
| } | | |

FIG. 7B

| Syntax | No. of Bits | Format |
|---|---|---|
| Layer_information() { | | |
|   layer_minimum LMI | 3 | uimslbf |
|   layer_maximum LMX | 3 | uimslbf |
|   reserved | 2 | 0x3 |
|   for ( I = LMI; I < LMX +1 ; i++ ){ | | |
|     layer_level_idc[i] | 8 | bslbf |
|   } | | |

FIG. 8

Semantics definition of Layer_information

| | | |
|---|---|---|
| layer_minimum LMI | (3) | layer INDICATED BY MINIMUM VALUE OF Temporal_id |
| layer_maximum LMX | (3) | layer INDICATED BY MAXIMUM VALUE OF Temporal_id |
| | | NUMBER OF LAYERS TO WHICH Temporal_id IS ASSIGNED=LMX-LMI+1 |
| layer_level_idc [i] | (8) | INDICATE level_idc OF EACH layer. |

FIG. 9

| Syntax | No. of Bits | Format |
|---|---|---|
| pes_extension_field_data (){ | | |
|   start_sync_byte | 8 | bslbf |
|   extension_field_type | 8 | bslbf |
|   layer_information() | | |
| } | | |

FIG. 10A

PES_extention_descriptor Syntax

| Syntax | No. of Bits | Format |
|---|---|---|
| PES_extention_descriptor() { | | |
| PES_extention_descriptor_tag | 8 | uimslbf |
| PES_extention_descriptor_length | 8 | uimslbf |
| PES_extension_existed | 1 | bslbf |
| reserved | 7 | 0x7f |
| } | | |

FIG. 10B

Semantics definition of PES_extention_descriptor

| PES_extension_existed | (1) | INDICATE WHETHER PES_extension field OF APPLICABLE PES STREAM IS ENCODED. |
|---|---|---|
| | 1 | PES_extension field IS ENCODED |
| | 0 | PES_extension field IS NOT ENCODED |

TRANSMISSION DEVICE, TRANSMISSION METHOD, RECEPTION DEVICE, AND RECEPTION METHOD

CROSS-REFERENCE TO RELATED APPLICATIONS

This application is a continuation of U.S. application Ser. No. 26/549,024, filed Aug. 23, 2019, which is a continuation of U.S. application Ser. No. 15/119,582, filed Aug. 17, 2016, (now U.S. Pat. No. 10,455,243), the entire contents of each of which are incorporated herein by reference. U.S. application Ser. No. 15/119,582 is a National Stage of PCT/JP2015/054090, filed Feb. 16, 2015, and claims the benefit of priority from Japanese Application No. 2014-045763, filed Mar. 7, 2014.

TECHNICAL FIELD

The present invention relates to a transmission device, a transmission method, a reception device, and a reception method, more specifically, to a transmission device that subjects image data of pictures constituting moving image data to hierarchical encoding and transmits the same, and others.

BACKGROUND ART

To service compressed moving images by way of broadcasting, networks, or the like, there is an upper limit on replayable frame frequency depending on decoding capability of a receiver. Therefore, service providers need to limit their services to low-frame frequency services or provide concurrently high-frame frequency services and low-frame frequency services, with consideration given to replaying capabilities of the prevailing receivers.

To correspond to high-frame frequency services, the receivers become higher in cost, which is a disincentive to popularization. When inexpensive receivers dedicated to low-frame frequency services are initially in widespread use and service providers start high-frame frequency services in the future, customers cannot receive, the high-frame frequency services without new receivers, which is a disincentive to proliferation of the new services.

For example, there is proposed time-direction scalability by subjecting image data of pictures constituting moving image data to hierarchical encoding by high efficiency video coding (HEVC) (refer to Non-patent Document 1). At the reception side, the levels of the pictures can be identified based on temporal ID (temporal_id) information inserted in the header of a network abstraction layer (NAL) unit, which allows selective decoding up to the level corresponding to decoding capability.

CITATION LIST

Non-Patent Document

Non-patent Document 1: Gary J. Sullivan, Jens-Rainer Ohm, Woo-Jin Han, Thomas Wiegand, "Overview of the High Efficiency Video Coding (HEVC) Standard" IEEE TRANSACTIONS ON CIRCUITS AND SYSTEMS FOR VIDEO TECNOROGY, VOL. 22, NO. 12. pp. 1649-1668, DECEMBER 2012

SUMMARY OF THE INVENTION

Problems to be Solved by the Invention

An object of the subject technique is to allow favorable decoding at the reception side.

Solutions to Problems

A concept of the subject technique lies in a transmission device including:
  an image encoding unit that classifies image data of pictures constituting moving image data into a plurality of levels and encodes the classified image data of the pictures at the respective levels to generate a video stream having the encoded image data of the pictures at the respective levels; and
  a transmission unit that transmits a container in a predetermined format containing the generated video stream, wherein
  the image encoding unit equalizes hierarchical composition between a low-level side and a high-level side, and combines corresponding pictures on the low-level side and the high-level side into one set and encodes the same sequentially.

According to the subject technique, the image encoding unit encodes the image data of the pictures constituting the moving image data to generate the video stream (encoded stream). In this case, the image data of the pictures constituting the moving image data is classified into a plurality of levels and encoded to generate the video stream having the image data of the pictures at the respective levels. The hierarchical composition is equalized between the low-level side and the high-level side. Corresponding pictures on the low-level side and the high-level side are combined into one set and are sequentially encoded.

The transmission unit transmits the container in the predetermined format including the foregoing video stream. For example, the image encoding unit may generate a single video stream having the encoded image data of the pictures at the respective levels or divide the plurality of levels into two sets of the upper-level side and the lower-level side and generate two video streams having the encoded image data of the pictures in the respective level sets.

According to the subject technique, the hierarchical composition is equalized between the low-level side and the high-level side, and corresponding pictures on the low-level side and the high-level side are combined into one set and are sequentially encoded. This allows the reception side to decode the encoded image data of the pictures on the low-level side and the high-level side with a smaller buffer size and a reduced decoding delay.

In the subject technique, for example, a hierarchical information insertion unit that inserts hierarchical information into a layer of the container may further be included. In this case, for example, the hierarchical information may have information on level specified values for the respective levels. In addition, in this case, for example, the hierarchical information insertion unit may insert the hierarchical information into the layer of the container at positions in synchronization with the encoded image data of the pictures in the video stream.

For example, the hierarchical information insertion unit may insert the hierarchical information into an extension field of a PES packet. In this case, the hierarchical information insertion unit may insert the hierarchical information into the extension field of the PES packet at least for each coded video sequence. In addition, in this case, for example, an information insertion unit that inserts information for describing explicitly whether the hierarchical information is inserted into the extension field of the PES packet may further be included under a program map table.

In addition, for example, the hierarchical information insertion unit may insert the hierarchical information under a program map table. In addition, for example, the hierarchical information insertion unit may insert the hierarchical information under an event information table.

The hierarchy information is inserted in the layer of the container, and the reception side can refer to the hierarchy information to retrieve selectively from the video stream the encoded image data of the pictures up to the level commensurate with the capability of the decoder in an easy manner.

In addition, another concept of the subject technique lies in a reception device including a reception unit that receives a container in a predetermined format that contains a video stream having encoded image data of pictures obtained by classifying image data of the pictures constituting moving image data into a plurality of levels and encoding the same, wherein
    in the encoding, hierarchical composition is equalized between a low-level side and a high-level side, and corresponding pictures on the low-level side and the high-level side are combined into one set and are sequentially encoded, and
    the reception device further includes a processing unit that processes the received container.

According to the subject technique, the reception unit receives the container in the predetermined format. The container contains the video stream having image data of the pictures at the respective levels obtained by classifying the image data of the pictures constituting the moving image data into a plurality of levels and encoding the same. In this case, in the process of encoding, the hierarchical composition is equalized between the low-level side and the high-level side, and corresponding pictures on the low-level side and the high-level side are combined into one set and are sequentially encoded.

The processing unit processes the received container. For example, the processing unit may be configured to retrieve selectively the encoded image data of the pictures at a predetermined level and lower ones from the video stream and decode the same based on the hierarchy information, thereby obtaining the image data of the pictures at the predetermined level and lower ones.

As described above, according to the subject technique, in the video stream contained in the received container, the hierarchical composition is equalized between the low-level side and the high-level side, and corresponding pictures on the low-level side and the high-level side are combined into one set and are sequentially encoded. This makes it possible to decode the encoded Image data of the pictures on the low-level side and the high-level side with a smaller buffer size and a reduced decoding delay.

According to the subject technique, hierarchical information may be inserted into a layer of the container, and
    the processing unit may retrieve selectively from the video stream the encoded image data of the pictures at a predetermined level and lower ones and decode the same, based on the hierarchical information, to obtain the image data of the pictures at the predetermined level and lower ones. In this case, it is easy to retrieve selectively from the video stream the encoded image data of the pictures at the level commensurate with the capability of the decoder in an easy manner.

Effects of the Invention

According to the subject technique, the reception side can perform favorable decoding. The advantages of the technique are not limited to the ones described here but may be any of advantages described in the subject disclosure.

BRIEF DESCRIPTION OF DRAWINGS

FIGS. 4A and 4B are diagrams illustrating a structural example (Syntax) of an NAL unit header and the contents (Semantics) of major parameters in the structural example.

FIG. 6 is a diagram illustrating a configuration example of encoded image data of pictures.

FIGS. 7A and 7B are diagrams illustrating a structural example (Syntax) of a layer decoding descriptor (Layer_decoding_descriptor).

FIG. 8 is a diagram illustrating the contents (Semantics) of major information in the structural example of the layer decoding descriptor.

FIG. 9 is a diagram illustrating a structural example (Syntax) of a PES extension field data "pes_extention_field_data( )".

FIGS. 10A and 10B are diagrams illustrating a structural example (Syntax) of a PES extension descriptor (PES_extension_descriptor) and the contents (Semantics) of major information in the structural example.

MODE FOR CARRYING OUT THE INVENTION

An embodiment for carrying out the invention (hereinafter, referred to as "embodiment") will be described below. The descriptions will be given in the following order:
1. Embodiment
2. Modification Example <1. Embodiment>
[Transmission/Reception System]

Figure 1:
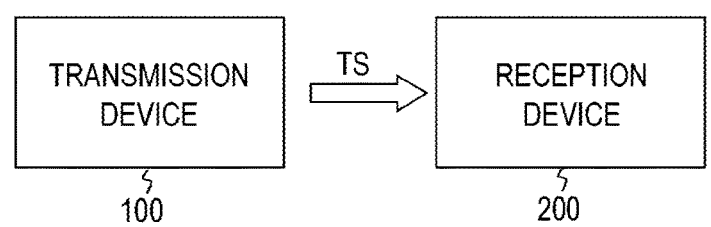
FIG. 1 is a block diagram of a transmission/reception system as an embodiment.

FIG. 1 illustrates a configuration example of a transmission/reception system 10 as an embodiment. The transmission/reception system 10 has a transmission device 100 and a reception device 200.

The transmission device 100 transmits a transport stream TS as a container carried on broadcast waves or in packets over a network. The transport stream TS contains a video stream in which image data of pictures constituting moving image data is classified into a plurality of levels and encoded data of the image data of the pictures at the respective levels is included. In this case, the transport stream TS contains a single video stream having the encoded image data of the pictures at the respective levels or two video streams in which the plurality of levels is divided into two sets of high-level side and low-level side and the encoded image data of the pictures at the respective level sets is included.

For example, the referenced pictures are encoded according to H.264/AVC or H.265/HEVC such that they belong to their levels and/or lower ones. In this case, the hierarchical composition is equalized between the low-level side and the high-level side, and corresponding pictures on the low-level side, and the high-level side are combined into one set and are sequentially encoded. Performing such encoding allows the reception side to decode the encoded image data of the pictures on the low-level side and the high-level side with a smaller buffer size and a reduced decoding delay.

Level identification information is added to the encoded image data of the pictures at the respective levels to identify the levels to which the pictures belong. In the embodiment, the level identification information ("nuh_temporal_id_plus1" indicative of temporal_id) is added to the headers of the NAL units (nal_unit) of the pictures. Adding the level identification information allows the reception side to retrieve selectively the encoded image data at the predetermined level and lower ones for decode processing.

Hierarchical information including information on level specified values at the respective levels and others is inserted into the layer of the container. The reception side can refer to the hierarchical information to retrieve selectively from the video stream the encoded image data of the pictures at the level commensurate with the capability of the decoder in an easy manner. For example, the hierarchical information is inserted under a program map table (PMT) or under an event information table (EIT).

In addition, the hierarchical information is inserted into PES extension fields of the headers of PES packets at positions in synchronization with the encoded image data of the pictures in the video stream, for example. This allows the reception side to, even with changes in the hierarchical composition, retrieve selectively from the video stream the encoded image data of the pictures at the level commensurate with the capability of the decoder.

When the hierarchical information is inserted into the extension field of the PES packet as described above, identification information indicating that the hierarchical information is inserted into the extension field of the PBS packet is inserted under the program map table. In this case, the reception side can identify a situation that the hierarchical information is inserted into the extension field of the PES packet based on the identification information.

The reception device 200 receives the transport stream TS sent from the transmission device 100 on broadcast waves or in packets over a network. The reception device 200 processes the transport stream TS. In this case, the reception device 200 retrieves selectively from the video stream the encoded image data of the pictures at a predetermined level and lower ones commensurate with the capability of the decoder and decodes the same based on the hierarchy information contained in the layer of the container, thereby obtaining the image data of the pictures at the predetermined level and lower ones.

"Configuration of the Transmission Device"

Figure 2:
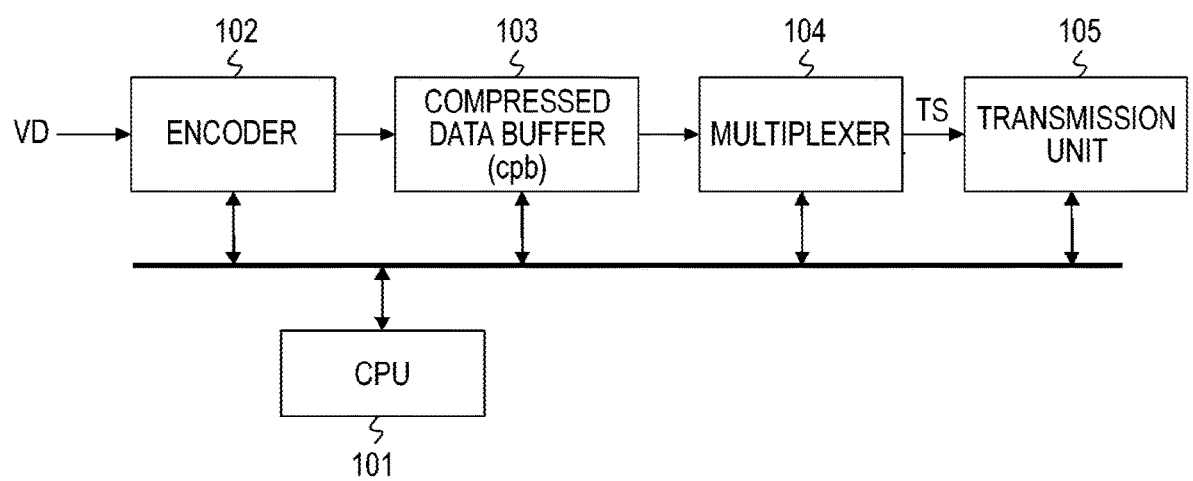
FIG. 2 is a block diagram of a configuration example of a transmission device.

FIG. 2 illustrates a configuration example of the transmission device 100. The transmission device 100 has a central processing unit (CPU) 101, an encoder 102, a compressed data buffer (cpb: coded picture buffer) 103, a multiplexer 104, and a transmission unit 105. The CPU 101 is a control unit that, controls the operations of the components of the transmission device 100.

The encoder 102 inputs uncompressed moving image data VD to perform hierarchical encoding. The encoder 102 classifies the image data of pictures constituting the moving image data VD into a plurality of levels. Then, the encoder 102 encodes the classified image data of the pictures at the respective levels to generate a video stream having the encoded image data of the pictures at the respective levels.

The encoder 102 performs encoding such as H.264/AVC or H.265/HEVC. At that time, the encoder 102 performs encoding such that the referenced pictures belong to their levels and/or lower ones. The encoder 102 also divides the plurality of levels into low-level side and high-level side, and equalizes the hierarchical composition between the low-level side and the high-level side, and combines corresponding pictures on the low-level side and the high-level side into one set and encodes the same sequentially.

Figure 3:
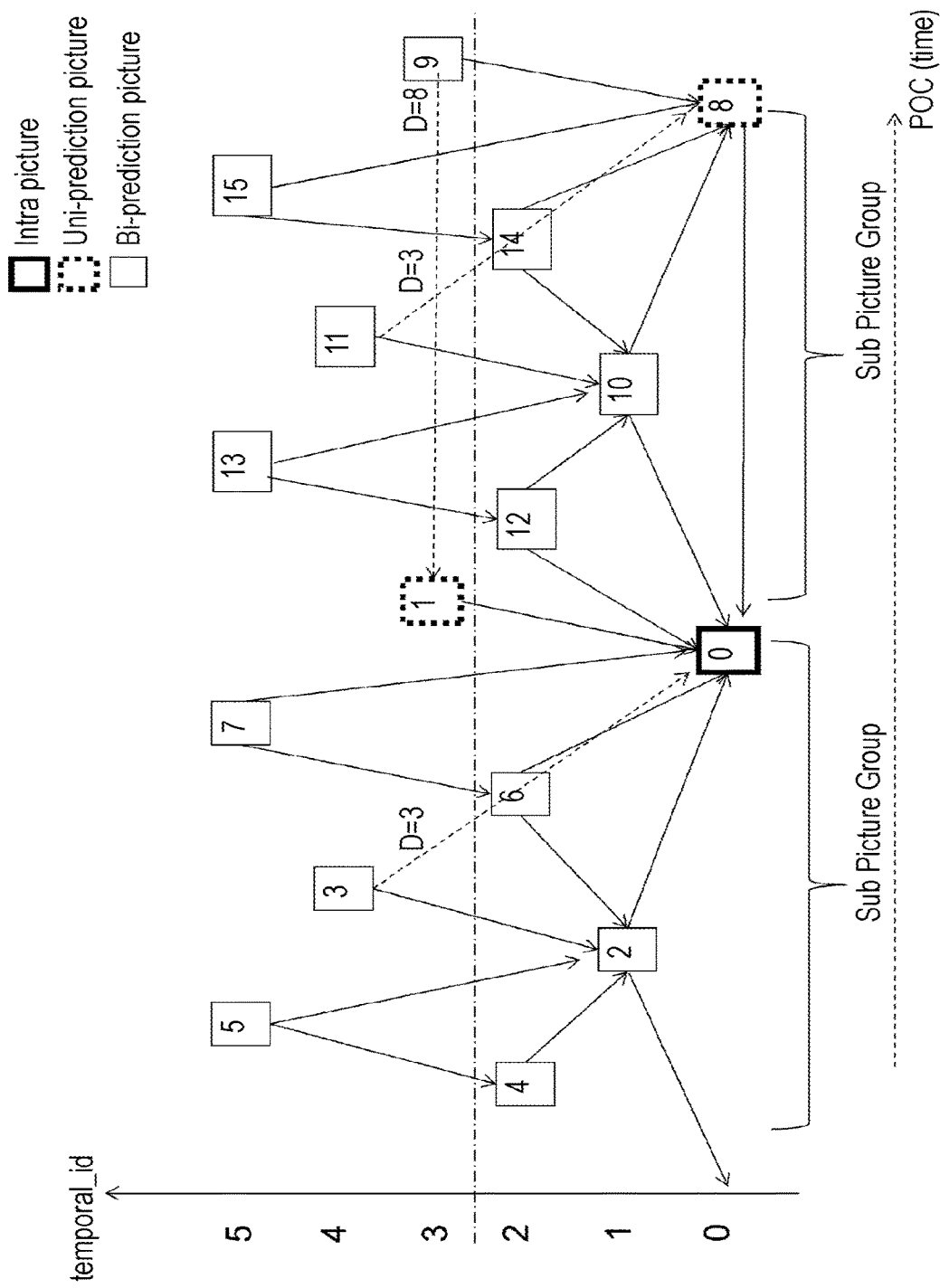
FIG. 3 is a diagram illustrating an example of hierarchical encoding performed by an encoder.

FIG. 3 illustrates an example of hierarchical encoding performed by the encoder 102. In this example, the image data of the pictures is classified into six levels of 0 to 5, and is subjected to encoding.

The vertical axis indicates the levels. The values 0 to 5 are set as the temporal_id (level identification information) added to the headers of the NAL units (nal_unit) constituting the encoded image data of the pictures at the levels 0 to 5. Meanwhile, the horizontal axis indicates the picture order of composition (POC), the display time is earlier with increasing proximity to the left side and is later with increasing proximity to the right side.

FIG. 4A illustrates a structural example (Syntax) of the NAL unit header, and FIG. 43 illustrates the contents (Semantics) of major parameters in the structural example. The 1-bit field "Forbidden_zero_bit" is essentially 0. The 6-bit field "Nal_unit_type" indicates the NAL unit type. The 6-bit field "Nuh_layer_id" is 0 as a precondition. The 3-bit field "Nuh_temporal_id_plus1" indicates temporal_id and takes the value increased by one (1 to 6).

Returning to FIG. 3, rectangular frames indicate pictures, and numbers in the rectangular frames indicate the order of coded pictures, that is, the encoding order (the decoding order at the reception side). For example, eight pictures of "0" to "7" constitute a sub group of pictures, and the picture "0" becomes the first picture in the sub group of pictures. Several sub groups of pictures are collected into a group of pictures (GOP).

In this example, three levels of 0 to 2 are on the low-level side and three levels of 3 to 5 are on the high-level side. As illustrated in the drawing, the hierarchical composition is equalized between the low-level side and the high-level side, and corresponding pictures on the low-level side and the high-level side are combined into one set and are sequentially encoded. For example, the picture "0" on the low-level side and the picture "1" on the high-level side are first combined into one set and subjected to encoding, and then the picture "2" on the low-level side and the picture "3" on the high-level side are combined into one sec and subjected to encoding. The pictures at the following levels are encoded in the same manner. In this case, the low levels are limited to levels lower than a specific level. Accordingly, to decode the pictures at the low levels, only the pictures at the limited low levels can be decoded and displayed in a stable manner. This matter also applies even when the pictures are not divided into the low levels and the high levels.

Returning to FIG. 3, solid-line and broken-line arrows indicate the reference relationships between the pictures in encoding. For example, the picture "0" is an intra picture picture) that needs no reference to other pictures, and the picture "3" is a P picture that is encoded with reference to the "1" picture. The picture "2" is a B picture that is encoded with reference to the "0" picture and a picture in the previous sub group of pictures (not illustrated). The picture "3" is a B picture that is encoded with reference to the "0" and "2" pictures. Similarly, the other pictures are encoded with reference to pictures close to them in the picture order of composition. The code "D" indicates how much each picture is distant from the referenced picture in the picture order of composition. Without the indication of "D," D=1.

Figure 5:
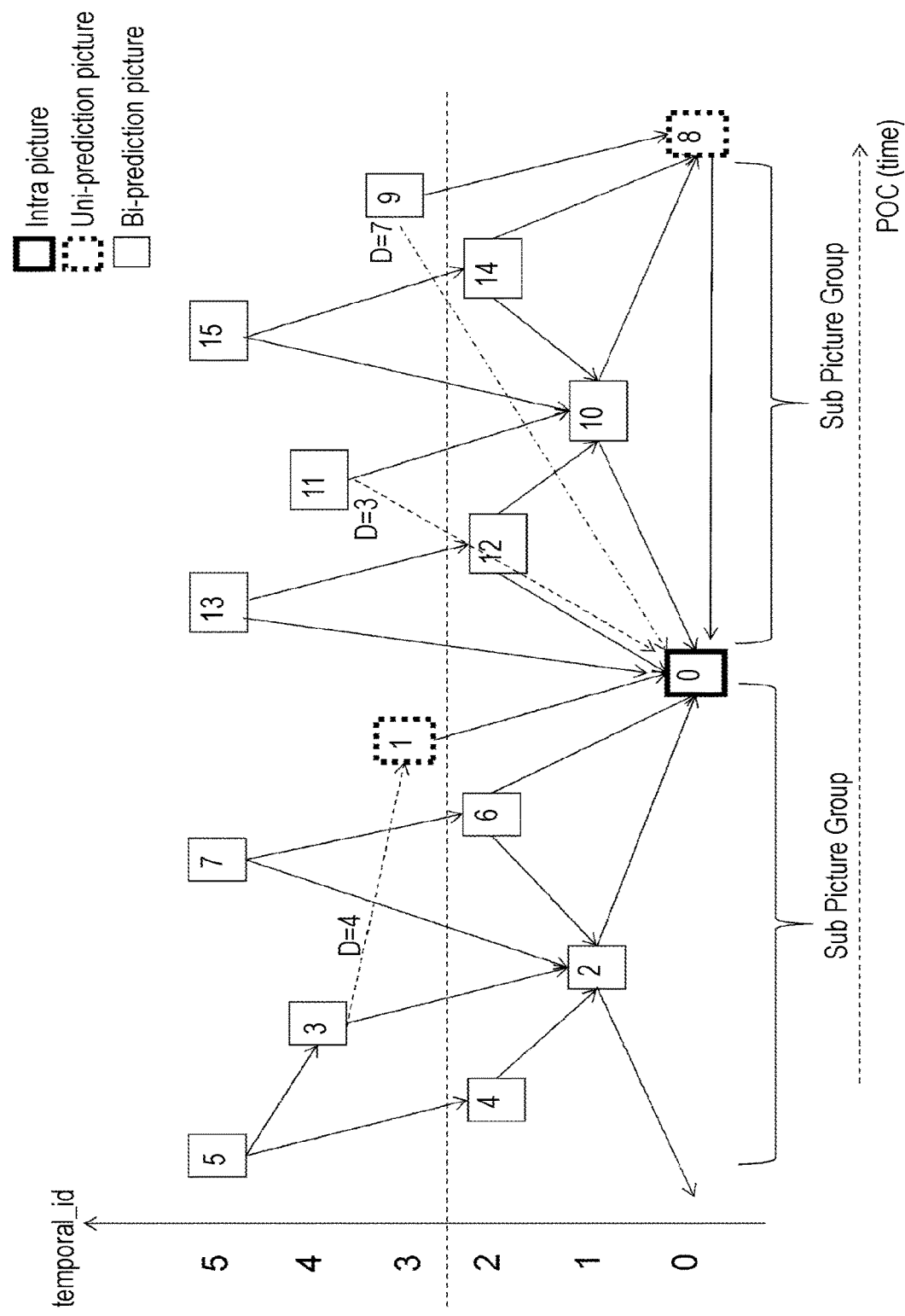
FIG. 5 is a diagram illustrating another example of hierarchical encoding performed by the encoder.

FIG. 5 illustrates another example of hierarchical encoding performed by the encoder 102. Although no detailed description will be provided, in the example of FIG. 3, the picture order of composition on the high-level side is one picture behind the picture order of composition on the low-level side, whereas, in the example of FIG. 5, the picture order of composition on the high-level side is one picture ahead of the picture order of composition on the low-level side. In this case, the hierarchical composition is equalized between the low-level side and the high-level side, and corresponding pictures on the low-level side and the high-level side are combined into one set and are sequentially encoded.

The encoder 102 generates a video stream having the encoded image data of the pictures at the respective levels. For example, the encoder 102 generates a single video stream having the encoded image data of the pictures at the respective levels or generates two video streams having the encoded image data of the pictures on the upper-order level side and the lower-order level side.

FIG. 6 illustrates a configuration example of encoded image data of the pictures. The encoded image data of the first picture of the GOP is composed of NAL units of access unit delimiter (AUD), video parameter set (VPS), sequence parameter set(SPS), picture parameter set (PPS), picture supplemental enhancement information (PSEI), SLICE, slice supplemental enhancement information (SSEI), and end of sequence (ECS). Meanwhile, the pictures other than the first picture of the GOP are composed of NAL units of AUD, PPS, PSEI, SLICE, SSEI, and EOS. The unit VPS can be transmitted together with the unit SPS once per sequence (GOP), and the unit PPS can be transmitted for each picture. The unit EOS may not exist.

The bit stream level specified value "general_level_idc" is inserted into the sequence parameter set (SPS). In addition, when the pictures belonging to the levels indicated by "temporal_id" are bound into sub layers (sub_layer) and "Sublayer_level_presented_flag" is set to "1," the bit rate level specified value for each sub layer "sublayer_level_idc" can also be inserted into the SPS. This matter is applied to not only the SPS but also the VPS.

For example, the example of hierarchical encoding illustrated in FIG. 3 will be discussed. The value of "general_level_idc" inserted into the SPS is a level value including all the pictures at the levels 0 to 5. For example, when the frame rate is 120 P, the value is "Level 5.2." The value of "sublayer_level idc_[2]" inserted into the SFS becomes a level value including only the pictures at the levels 0 to 2, For example, when the frame rate is 60 P, the value is "Level 5.1."

Returning to FIG. 2, the compressed data buffer (cpb) 103 accumulates temporarily the video stream containing the encoded image data of the pictures at the respective levels generated by the encoder 102. The multiplexer 104 reads the video stream accumulated in the compressed data buffer 103, turns the same into a PES packet, and further turns the same into a transport packet to multiplex the same, thereby obtaining a transport stream TS as a multiplexed stream. The transport, stream TS contains one or more video streams as described above.

The multiplexer 104 inserts the hierarchical information into the layer of the container. The transmission unit 105 transmits the transport stream TS obtained by the multiplexer 104 on broadcast, waves or in packets over a network to the reception device 200.

[Insertion of the Hierarchical Information]

The insertion of the hierarchical information by the multiplexer 104 will be further explained. The multiplexer 104 inserts the hierarchical information to the layer of the container by any of the following methods (A), (B), and (C), for example:

(A) Insert the hierarchical information under the program map table (PMT);
(B) Insert the hierarchical information under the event information table (EIT); and
(C) Insert the hierarchical information into the extension field of the header of the PES packet.

"Description of (A)"

The transport stream TS contains a PMT as program specific information (PSI). The PMT has a video elementary loop (video ES1 loop) with information related to each video stream. In the video elementary loop, information such as stream type and packet identifier (PID) is arranged and descriptors describing information related to each video stream are also arranged in correspondence with the video stream.

The multiplexer 104 inserts a layer decoding descriptor (Layer_decoding_descriptor) newly defined as one of the descriptors. FIGS. 7A and 7B illustrate a structural example (Syntax) of the layer decoding descriptor. FIG. 8 illustrates the contents (Semantics) of major information in the structural example.

The 8-bit field "Layer_decoding_descriptor_tag" indicates descriptor type, and in this example, layer decoding descriptor. The 8-bit field "Layer_decoding_descriptor_length" indicates the length (size) of the descriptor as the number of bytes of the subsequent "layer information( )."

FIG. 7B illustrates a structural example (Syntax) of "layer_information( )." The 1-bit field "layer_minimum LMI" indicates the level (layer) indicated by the minimum value of "temporal_id." The 3-bit field "layer_maximum LMX" indicates the level (layer) indicated by the maximum value of "temporal_id." In this example, the number of layers to which "temporal_id" is assigned is (LMX−LMI+1). The 8-bit field "layer_level_idc(i)" indicates "level_idc" as level specified value of the bit rate at each level.

"Description of (B)"

The transport stream TS also contains EIT as SI (serviced information) for management of each event. The multiplexer 104 arranges the layer decoding descriptor described above (see FIGS. 7A and 7B) under the EIT. In this case, the multiplexer 104 also arranges a conventionally known component descriptor under the EIT to make a link with the PES stream.

"Description of (C)"

PES extension field can be provided in the header of the PES packet. The multiplexer 104 inserts PES extension field data having hierarchical information into the extension field. In this manner, the multiplexer 104 provides the PES extension field in the header of the PES packet to insert the PES extension field data having hierarchical information at least for each coded video sequence (CVS), for example. FIG. 9 illustrates a structural example (Syntax) of the PES extension field data "pes_extension_field_data( )."

The "PES extension field length" is given outside the syntax structure. The 8-bit field "start_sync_byte" indicates the code value representing the start of the extension field. The 8-bit field "extension_field_type" indicates the type of the extension field, which means the supply of hierarchical information in this example. The "layer_information( )" has fields "layer_minimum LMI," "layer_minimum LMX," and "layer_level_idc[i]," as described above (see FIG. 7B).

In this case, the multiplexer 104 arranges a PES extension descriptor (PES_extension_descriptor) as one of the descriptors in the video elementary loop to describe explicitly that the hierarchical information is inserted into the PES extension field.

FIG. 10A illustrates a structural example (Syntax) of the PES extension descriptor (PES_extension_descriptor). FIG. 10B illustrates the contents (Semantics) of major information in the structural example. The 8-bit field "PES_extention_descriptor_tag" Indicates the type of the descriptor, which means the PES extension descriptor in this example.

The 8-bit field "PBS_extention_descriptor_length" indicates the length (size) of the descriptor as the number of subsequent bytes. The 1-bit field "PES_extension_existed" indicates whether the FES extension field of the applicable PES stream is encoded. The value "1" indicates that the PES extension field is encoded, and the value "0" indicates that the PES extension field is not encoded.

[Configuration of the Transport Stream TS]

Figure 11:
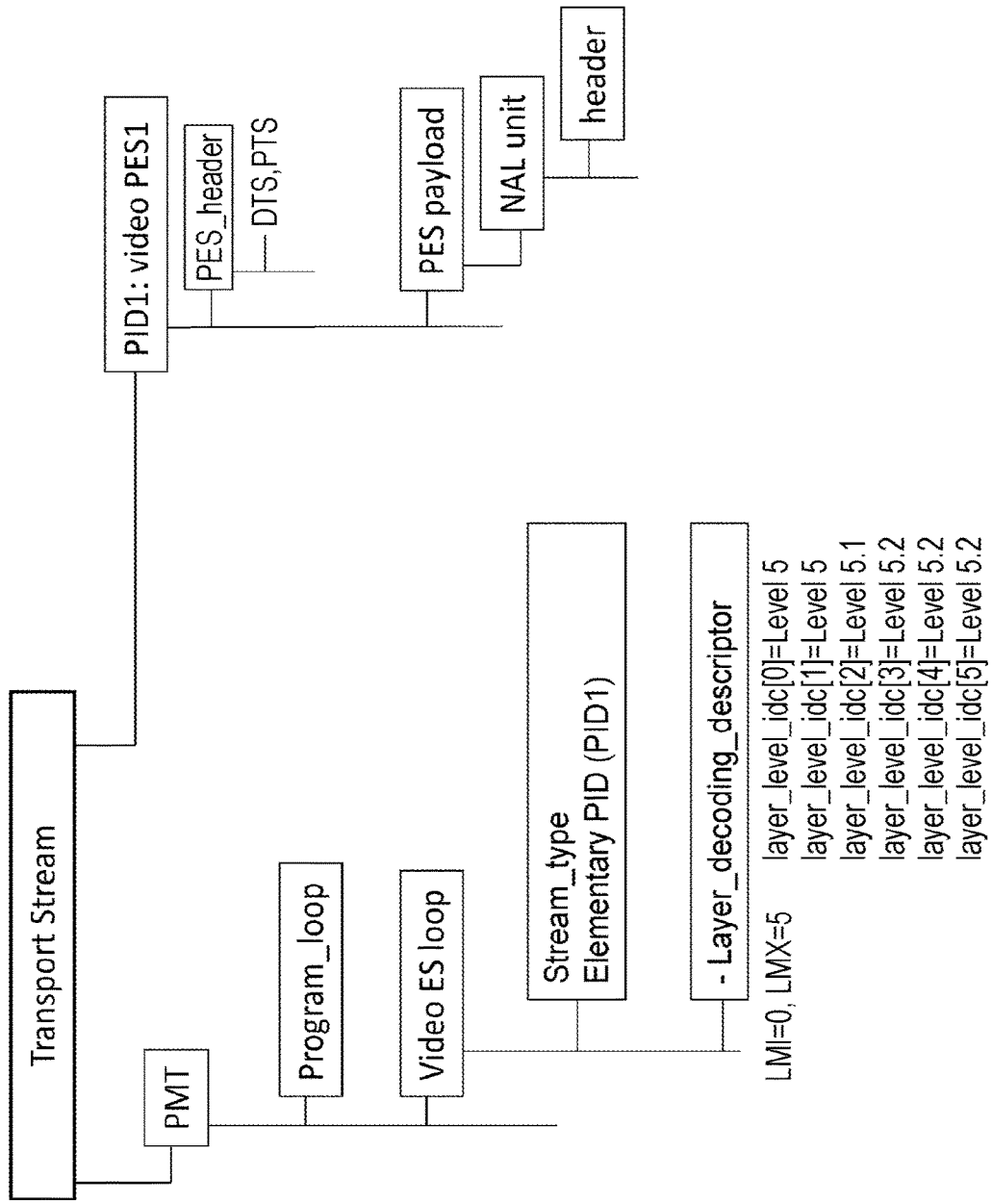
FIG. 11 is a diagram of a configuration example of a transport stream TS in the case where single-stream distribution is performed and hierarchical information is inserted under a program map table.

FIG. 11 illustrates a configuration example of the transport stream TS in the case where single-stream distribution is performed and the hierarchical information is inserted under the program map table (PMT) (the foregoing case (A)). In this configuration example, there is a PES packet "video PES1" of a video stream having image data encoded by HEVC of pictures at a plurality of levels, for example.

The encoded image data of the pictures have NAL units such as VPS, SPS, PPS, SLICE and SEI. As described above, the level identification information ("nuh_temporal_id_plus1" indicative of temporal_id) for the picture is arranged in the headers of the NAL units. The level specified value of the bit stream "general_level_idc" is inserted into the SPS. In a addition, the pictures belonging to the levels indicated by "temporal_id" are bound into sub layers (sub_layer) and "Sublayer_level_presented_flag" is set to "1," whereby the bit rate level specified value for each sub layer "sublayer_level_idc" is inserted into the SPS.

The transport stream TS also contains the program map table (PMT) as program specific information (PSI). The PSI is information describing to which program each elementary stream contained in the transport stream belongs.

The PMT has a program loop describing information related to the entire program. The PMT also has an elementary loop with information related to each elementary stream. In this configuration example, there exists a video elementary loop (video ES loop).

In the video elementary loop, information such as stream type and packet identifier (PID) is arranged in correspondence with the video stream (video PES1), and descriptors describing information related to the video stream are also arranged. As one of the descriptors, the layer decoding descriptor (Layer_decoding_descriptor) described above is inserted.

For example, in the examples of hierarchical encoding illustrated in FIGS. 3 and 5, the contents described by the descriptor are as follows: "layer_minimum LMI"=0, "layer_maximum LMX"=5, "layer_level_idc[0]"=Level 5, "layer_level_idc[1]"=Level 5, "layer_level_idc[2]"=Level 5.1, "layer_level_idc[3]"=Level 5.2, "layer_level_idc[4]"=Level 5.2, and "layer_level__idc[5]"=Level 5.2.

Figure 12:
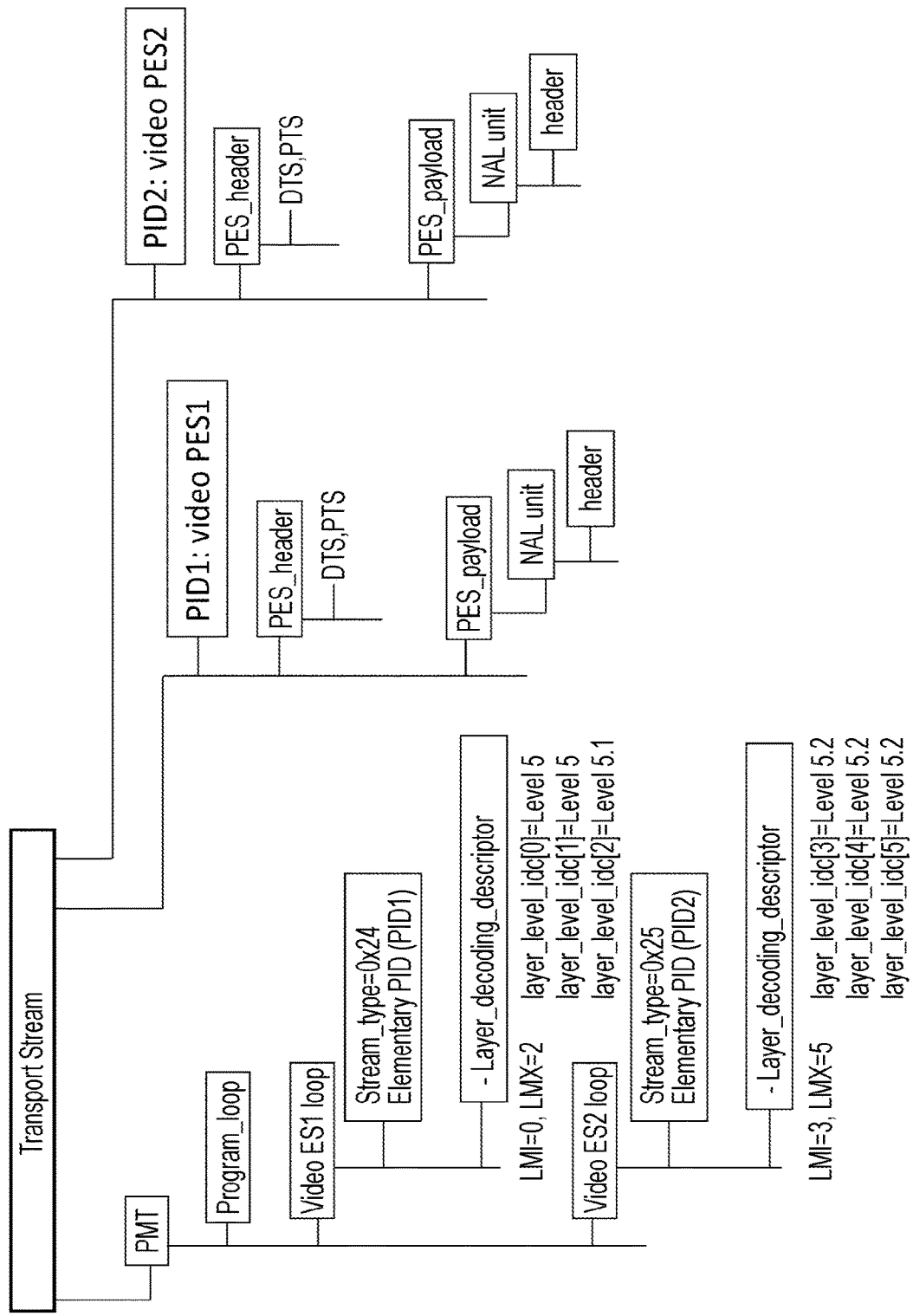
FIG. 12 is a diagram of a configuration example of the transport stream TS in the case where two-stream distribution is performed and hierarchical information is inserted under the program map table.

FIG. 12 illustrates a configuration example of the transport stream TS in the case where two-stream distribution is performed and the hierarchical information is inserted under the program map table (PMT) (the foregoing case (A)). In this configuration example, a plurality of levels is divided into two sets of low-level side and high-level side, and there exist PES packets "video PES1" and "video PES2" of the video streams having image data encoded by HEVC of the pictures of the two sets, for example.

The encoded image data of the pictures on the low-level side have NAL units such as VPS, SPS, PPS, SLICE, and SEI. The hierarchical identification information ("nuh_temporal_id_plus1" indicative of temporal_id) of the picture is arranged in the header of the NAL units. The level specified value of the bit stream "general_level_idc" is inserted into the SPS. In addition, the pictures belonging to the levels indicated by "temporal_id" are bound into sub layers (sub_layer) and "sublayer_level_presented_flag" is set to "1," whereby the bit rate level specified value for each sub layer "sublayer_level_idc," is inserted into the SPS.

Meanwhile, the encoded image data of the pictures on the high-level side have NAL units such as PPS and SLICE. The hierarchical identification information ("nuh_temporal_id_plus1" indicative of temporal_id) of the picture is arranged in the headers of the NAL units.

The transport stream TS also contains the program map table (PMT) as program specific information (PSI). The PSI is information describing to which program each elementary stream contained in the transport stream belongs.

The PMT has a program loop describing information related to the entire program. The PMT also has an elementary loop with information related to each elementary scream. In this configuration example, there exist two video elementary loops (video ES1 loop and video ES2 loop).

In the video elementary loop, information such as stream type and packet identifier (PID) is arranged in correspondence with the video streams (video PES1 and video PES2), and descriptors describing information related to the video streams are also arranged. As one of the descriptors, the layer decoding descriptor (Layer_decoding_descriptor) described above is inserted.

For example, in the examples of hierarchical encoding illustrated in FIGS. 3 and 5, the contents described by the descriptors corresponding to the PES packets "video PES1" and "video PES2" are as follows: the descriptor corresponding to the PES packet "video PES1" describes "layer_minimum LMI"=0, "layer_maximum LMX"=2, "layer level_idc [0]"=Level 5, "layer_level_idc[1]"=Level 5, and "layer_level_idc[2]"=Level 5.1; and the descriptor corresponding to the PES packet "video PES1" describes "layer_minimum LMI"=3, "layer_maximum LMX"=5, "layer_level_idc[3]"=Level 5.2, "layer_level_idc[4]"=Level 5.2, and "layer_level_idc[5]"=Level 5.2.

Figure 13:
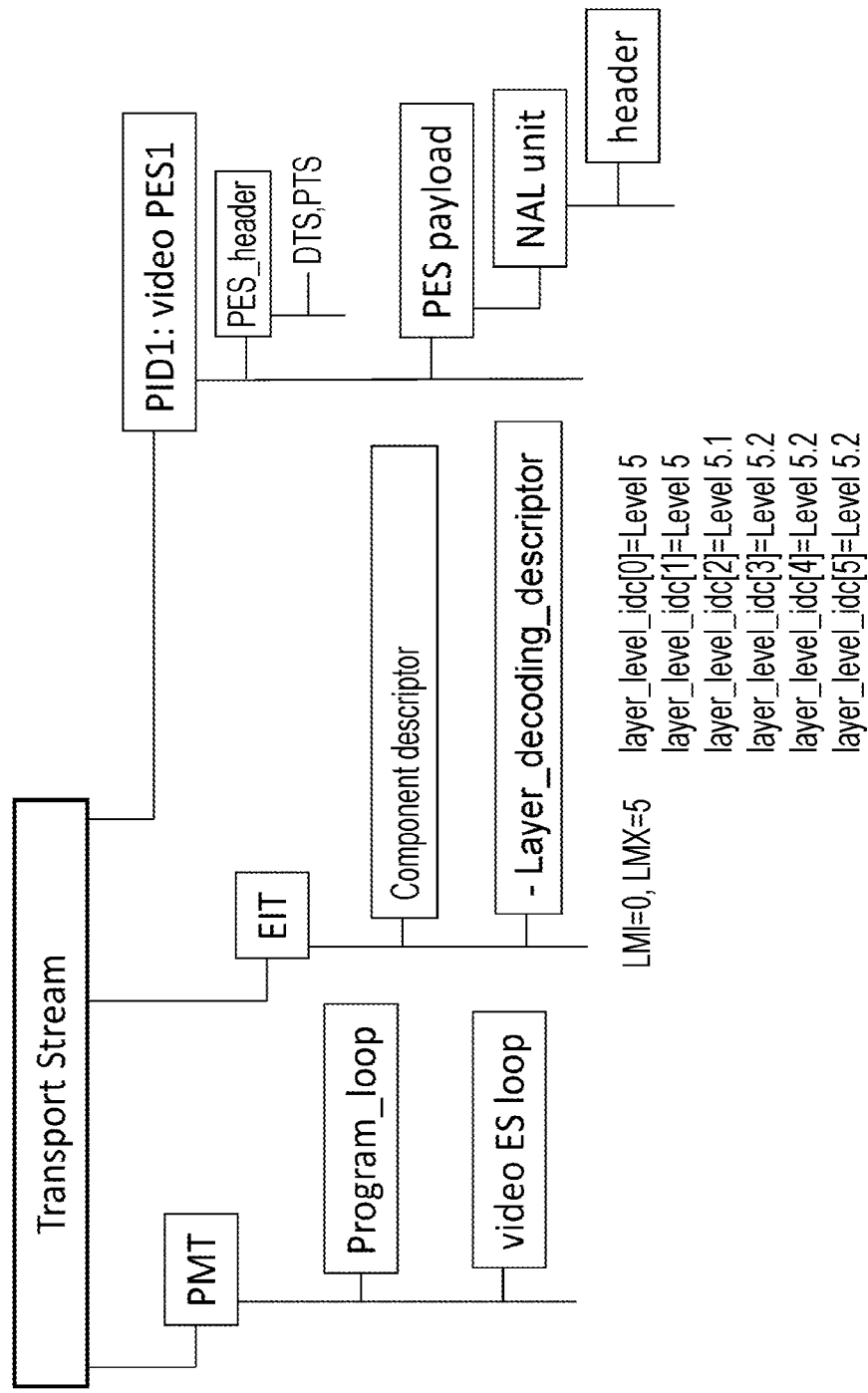
FIG. 13 is a diagram of a configuration example of the transport stream TS in the case where single-stream distribution is performed and hierarchical information is inserted under an event information table.

FIG. 13 illustrates a configuration example of the transport stream TS in the case where single-stream distribution is performed and the hierarchical information is inserted under the event information table (EIT) (the foregoing case (B)). In this configuration example, as in the configuration example of FIG. 11, there exists the PES packet "video PES1" of the video stream having the image data encoded by HEVC of the pictures at a plurality of levels, for example.

The transport stream TS contains the program map table (PMT) as program specific information (PSI). The PSI is information describing to which program each elementary stream contained in the transport stream belongs.

The PMT has a program loop describing information related to the entire program. The PMT also has elementary loops with information related to each elementary stream. The PMT has a program loop describing information related to the entire program. The PMT also has an elementary loop with information related to each elementary stream. In this configuration example, there exists a video elementary loop (video ES loop). In the video elementary loop, information such as stream type and packet identifier (PID) is arranged in correspondence with the video stream (video PES1), and descriptors describing information related to the video stream are also arranged.

The transport stream TS also contains EIT as SI (serviced information) for management of each event. The layer decoding descriptor (Layer_decoding_descriptor) described above is arranged under the EIT. Although not explained in detail, the contents described by the descriptor are the same as those in the configuration example of FIG. 11. A conventionally known component descriptor is arranged under the EIT to make a link with the PES packet "video PES1."

Figure 14:
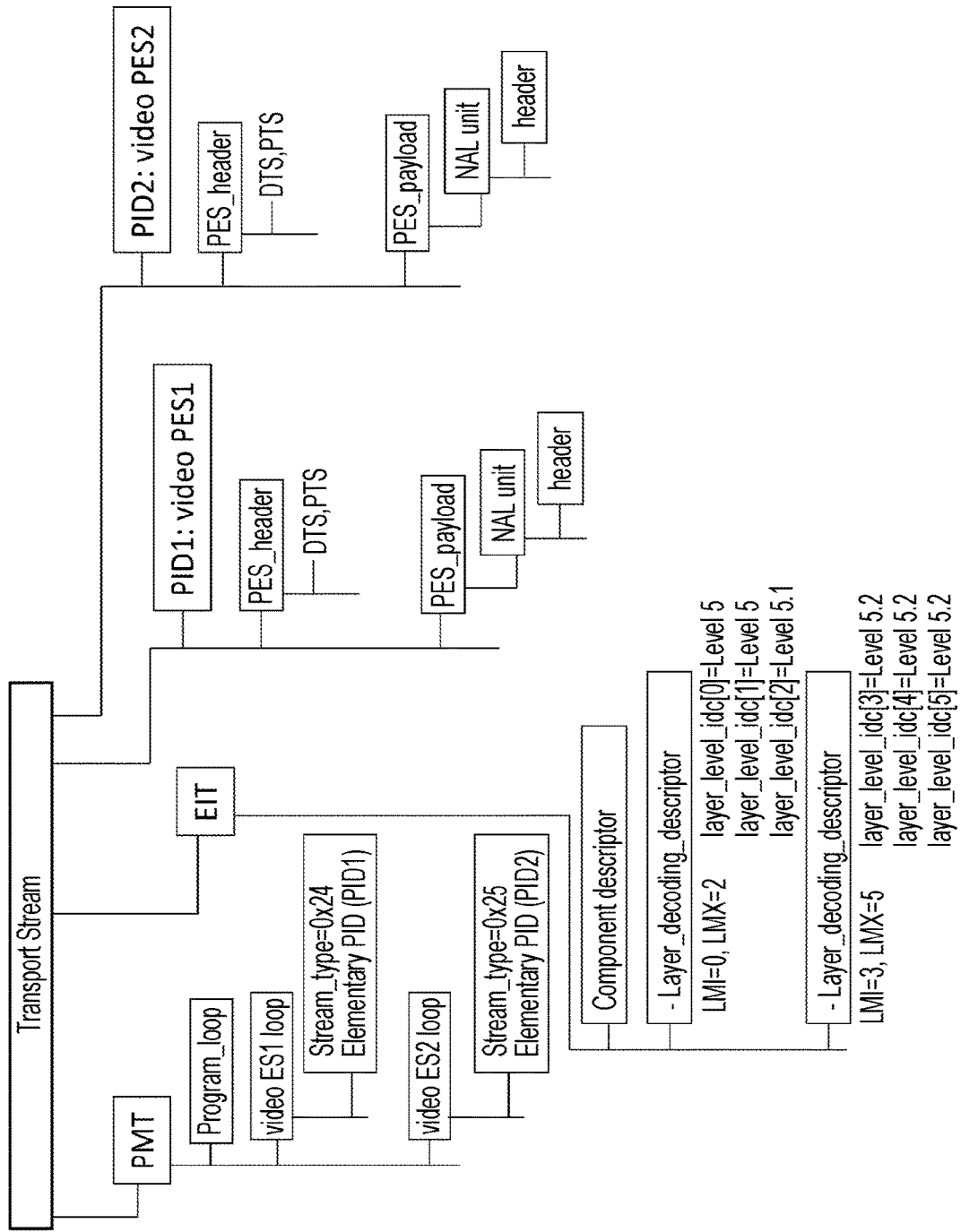
FIG. 14 is a diagram of a configuration example of the transport stream TS in the case where two-stream distribution is performed and hierarchical information is inserted under the event information table.

FIG. 14 illustrates a configuration example of the transport stream TS in the case where two-stream distribution is performed and the hierarchical information is inserted under the event information table (EIT) (the foregoing case (B)). In this configuration example, a plurality of levels is divided into two sets of low-level side and high-level side, and there exist PES packets "video PES1" and "video PES2" of the video streams having image data encoded by HEVC of the pictures of the two sets, for example, as in the configuration example of FIG. 12.

The transport stream TS also contains the program map table (PMT) as program specific information (PSI). The PSI is information describing to which program each elementary stream contained in the transport stream belongs.

The PMT has a program loop describing information related to the entire program. The PMT also has an elementary loop with information related to each elementary stream. In this configuration example, there exist two video elementary loops (video ES1 loop and video ES2 loop). In the video elementary loop, information such as stream type and packet identifier (PID) is arranged in correspondence with the video streams (video PES1 and video PES2), and descriptors describing information related to the video streams are also arranged.

The transport stream TS also contains EIT as serviced information (SI) for management of each event. The layer decoding descriptors (Layer_decoding_descriptor) corresponding to the PES packets "video PES1" and "video PES2" are arranged under the EIT. Although not explained in detail, the contents described by the descriptors are the same as those in the configuration example of FIG. 12. A conventionally known component descriptor is arranged under the EIT to make links with the PES packets "video PES1" and "video PES2."

Figure 15:
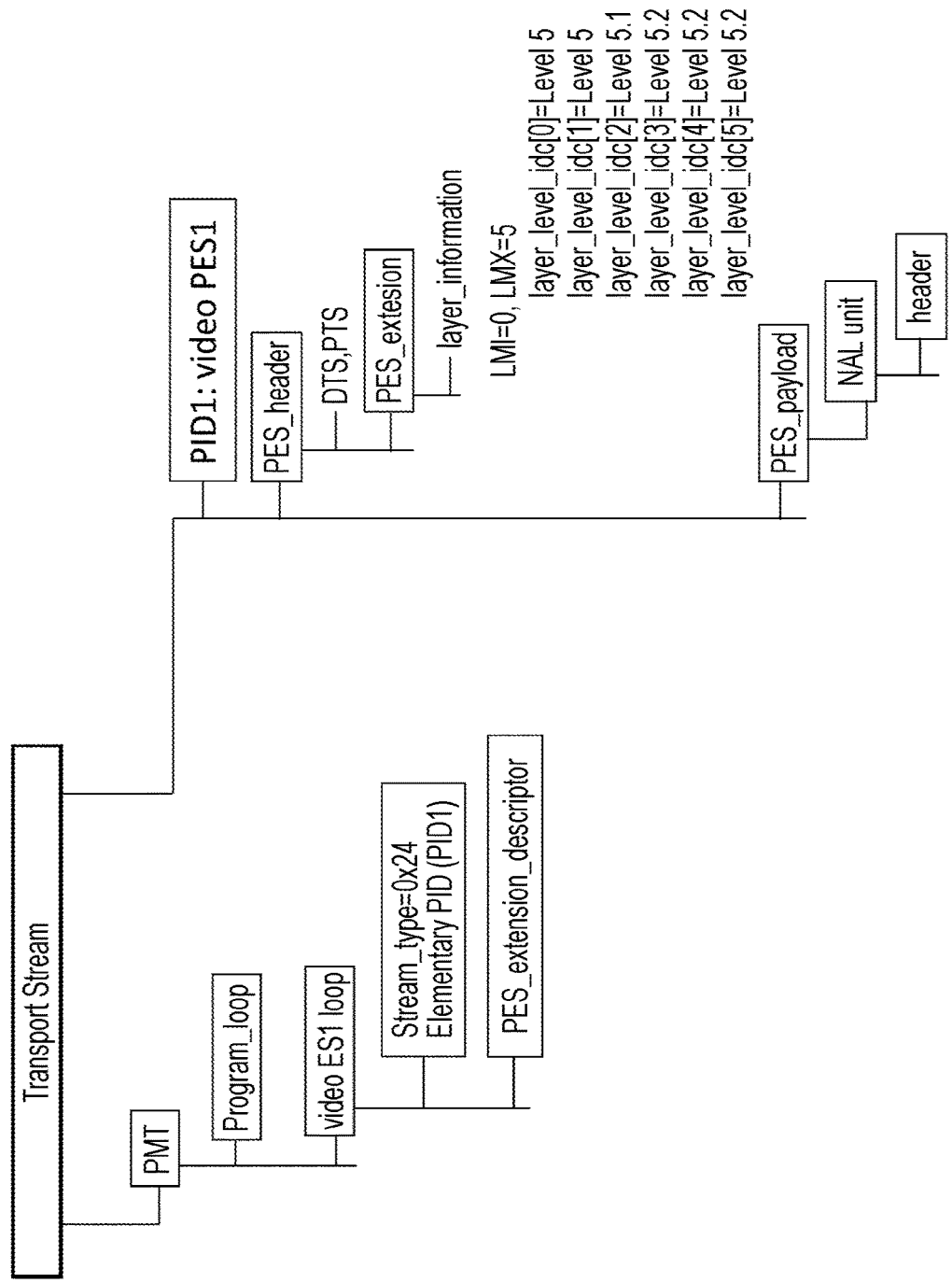
FIG. 15 is a diagram of a configuration example of the transport stream TS in the case where single-stream distribution is performed and hierarchical information is inserted into an extension field of a PES packet header.

FIG. 15 illustrates a configuration example of the transport stream TS in the case where single-stream distribution is performed and the hierarchical information is inserted into the extension field of the header of the PES packet (the foregoing case (C)). In this configuration example, there is a PES packet "video PES1" of a video stream having image data encoded by HEVC of pictures at a plurality of levels, for example, as in the configuration example of FIG. 11.

A PES extension field is provided in the header of the PES packet, and PES extension field data "pes_extension_field_data( )" having "layer_information( )" is inserted into the PES extension field. Although not described in detail, the contents described in "layer_information( )" are the same as those described by the layer decoding descriptor in the configuration example of FIG. 11.

The transport stream TS also contains the program map table (PMT) as program specific information (PSI). The PSI is information describing to which program each elementary stream contained in the transport stream belongs.

The PMT has a program loop describing information related to the entire program. The PMT also has an elementary loop with information related to each elementary stream. In this configuration example, there exists a video elementary loop (video ES loop).

In the video elementary loop, information such as stream type and packet identifier (PID) is arranged in correspondence with the video streams (video PES1 and video PES2), and descriptors describing information related to the video streams are also arranged. As one of the descriptors, a PES extention descriptor (PES_extention_descriptor) is inserted. The PES extention descriptor is a descriptor to describe explicitly that the hierarchical information is inserted into the PES extension field.

Figure 16:
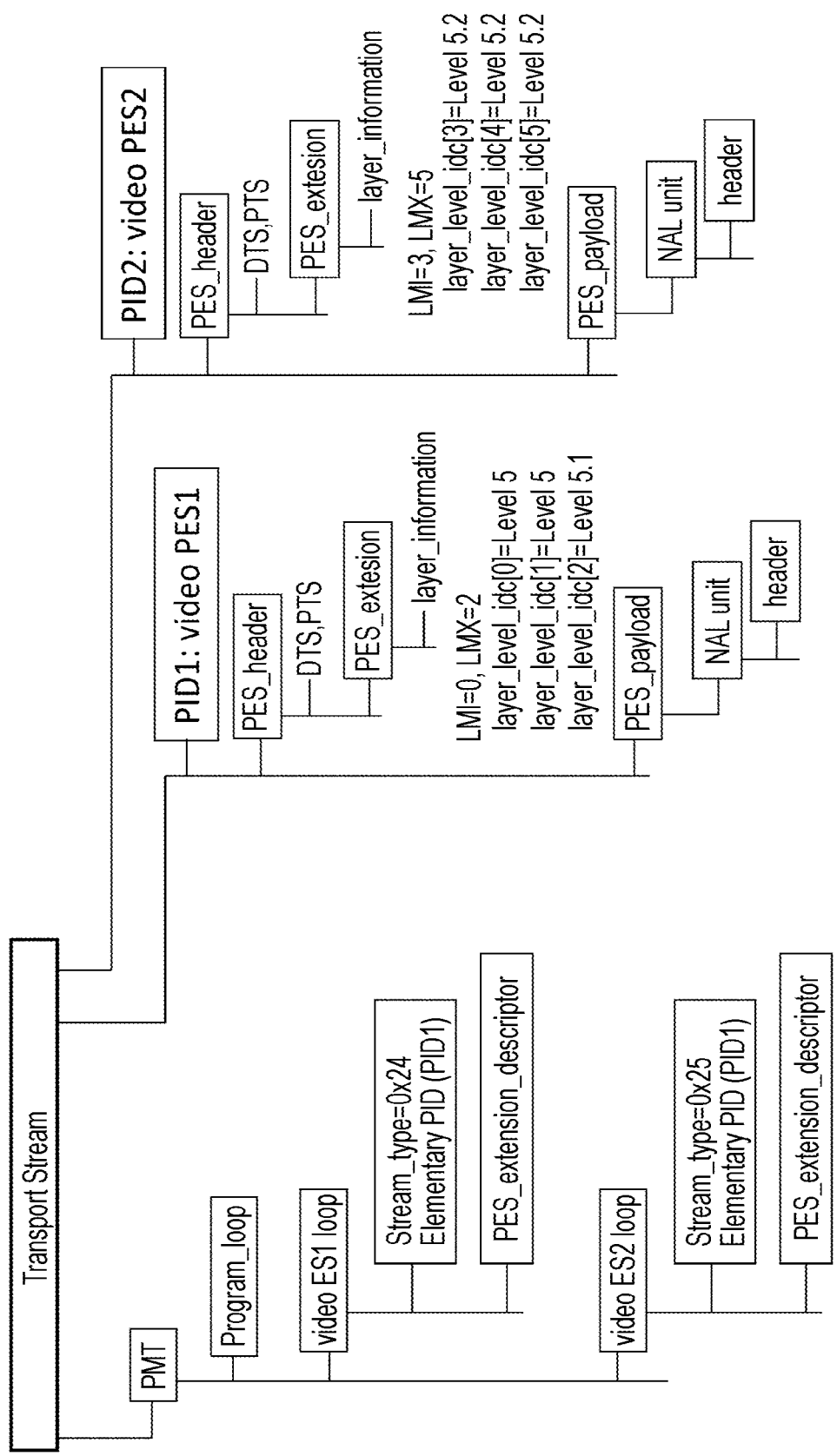
FIG. 16 is a diagram of a configuration example of the transport stream TS in the case where two-stream distribution is performed and hierarchical information is inserted into the extension field of the PES packet header.

FIG. 16 illustrates a configuration example of the transport stream TS in the case where two-stream distribution is performed and the hierarchical information is inserted into the extension field of the header of the PES packet (the foregoing case (C)). In this configuration example, a plurality of levels is divided into two sets of low-level side and high-level side, and there exist PES packets "video PES1" and "video PES2" of the video streams having image data encoded by HEVC of the pictures of the two sets, for example, as in the configuration example of FIG. 12.

A PES extension field is provided in the header of the PES packet "video PES1", and PES extension field data "pes_extension_field_data( )" having "layer_information( )" is inserted into the PES extension field. Although not described in detail, the contents described in "layer_information( )" are the same as those described by the layer decoding descriptor corresponding to the PES packet "video PES1" in the configuration example of FIG. 12.

A PES extension field is provided in the header of the PES packet "video PES2", and PES extension field data "pes_extension_field_data( )" having "layer_information( )" is inserted into the PES extension field. Although not described in detail, the contents described in "layer_information( )" are the same as those described by the layer decoding descriptor corresponding to the PBS packet "video PES2" in the configuration example of FIG. 12.

The transport stream TS also contains the PMT (program map table) as PSI (program specific information). The PSI is information describing to which program each elementary stream contained in the transport stream belongs.

The PMT has a program loop describing information related to the entire program. The PMT also has an elementary loop with information related to each elementary stream. In this configuration example, there exist two video elementary loops (video ES1 loop and video ES2 loop).

In the video elementary loop, information such as stream type and packet identifier (PID) is arranged in correspondence with the video streams (video PES1 and video PES2), and descriptors describing information related to the video streams are also arranged. As one of the descriptors, a PES extention descriptor (PES_extention_descriptor) is inserted. The PES extention descriptor is a descriptor to describe explicitly that the hierarchical information is inserted into the PES extension field.

Operation of the transmission device 100 illustrated in FIG. 2 will be briefly described. Uncompressed moving image data VD is input into the encoder 102. The encoder 102 subjects the moving image data VD to hierarchical encoding. Specifically, the encoder 102 classifies image data of pictures constituting the moving image data VD into a plurality of levels and encodes the same, thereby generating a video stream having encoded image data of the pictures at the respective levels.

In this case, the referenced pictures are encoded such that they belong to their levels and/or lower ones. In this case, a plurality of levels is divided into two of low-level side and high-level side, and the hierarchical composition is equalized between the low-level side and the high-level side, and corresponding pictures on the low-level side and the high-level side are combined into one set and are sequentially encoded. Also in this case, a single video stream having the encoded image data of the pictures at the respective levels is generated, or two video streams having the encoded image data of the pictures on the upper-order level side and the lower-order level side are generated.

The video stream generated by the encoder 102 and containing the encoded data of pictures at the respective levels is supplied to the compressed data buffer (cpb) 101 and is temporarily accumulated there. The multiplexer 104 reads the video stream from the compressed data buffer 103, turns the same into PES packet, further turns the same into transport packet for multiplexing, thereby obtaining the transport stream TS as a multiplexed stream. The transport stream TS contains one or more video streams as described above.

When the multiplexer 104 generates the transport stream TS, the hierarchical information is inserted in the layer of the container under the program map table (PMT), under the event information table (EIT), or in the extension field of the header of the PES packet. The transport stream TS generated by the multiplexer 104 is sent to the transmission unit 105. The transmission unit 105 transmits the transport stream TS on broadcast waves or in packets over a network to the reception device 200.

"Configuration of the Reception Device"

Figure 17:
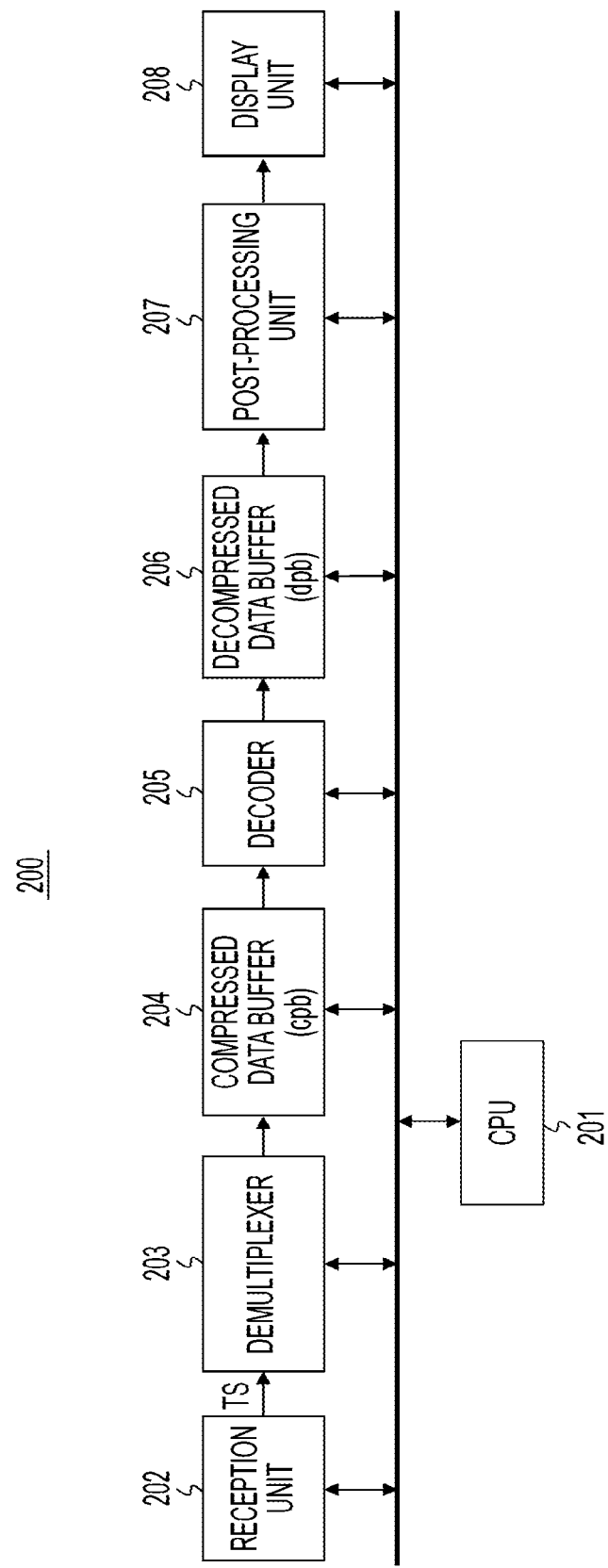
FIG. 17 is a block diagram illustrating a configuration example of a reception device.

FIG. 17 illustrates a configuration example of the reception device 200. The reception device 200 has a central processing unit (CPU) 201, a reception unit 202, a demultiplexer 203, and a compressed data buffer (cpb: coded picture buffer) 204. The reception device 200 also has a decoder 205, a decompressed data buffer (dpb: decoded picture buffer) 206, a post-processing unit 207, and a display unit 208. The CPU 201 constitutes a control unit that controls operations of the components of the reception device 200.

The reception unit 202 receives the transport stream TS on broadcast waves or in packets over a network transmitted from the transmission device 100. The demultiplexer 203 retrieves selectively from the transport stream TS the encoded image data of the pictures at the level commensurate with the capability of the decoder 205, and sends the same to the compressed data buffer (cpb: coded picture buffer) 204. In this case, the demultiplexer 201 refers to the value of "nuh_temporal_id_plus1" indicative of "temporal_id" arranged in the headers of the NAL units (nal_unit) of the pictures.

In this case, the demultiplexer 203 extracts the hierarchical information inserted in the layer of the container, recognizes "layer_level_idc" at the respective levels from the hierarchical information, and detects up to which level decoding is enabled according to the capability of the decoder 205. For example, in the examples of hierarchical encoding of FIGS. 3 and 5, it is assumed that "layer_level_idc[0]"=Level 5, "layer_level_idc[1]"=Level 5, "layer_level_idc[2]"=Level 5.1, "layer_level_idc[3]"=Level 5.2, "layer_level_idc[4]"=Level 5.2, and "layer_level_idc[5]"=Level 5.2. In this case, when the decoder 205 has a capability of 60 P, that is, "Level 5.1," the demultiplexer 203 detects that decoding is enabled up to the level 2. In addition, in this case, when the decoder 205 has a capability of 120 P, that is, "Level 5.2," the demultiplexer 203 detects that decoding is enabled up to the level 5.

The compressed data buffer (cpb) 204 accumulates temporarily the encoded image data of pictures at the respective levels sent from the demultiplexer 203. The decoder 205 reads and decodes the encoded image data of the pictures accumulated in the compressed data buffer 204 at decode timings given by decoding time stamps (DTS) of the pictures, and sends the same to the decompressed data buffer (dpb) 206.

The decompressed data buffer (dpb) 206 accumulates temporarily the image data of the pictures decoded by the decoder 205. The post-processing unit 207 matches the frame rate for the image data of the pictures read sequentially at display timings given by presentation time stamps (PTS) from the decompressed data buffer (dpb) 206 with the display capability.

For example, when the frame rate of image data of the pictures after decoding is 60 fps and the display capability is 120 fps, the post-processing unit 207 performs interpolation in the image data of the pictures after decoding such that the time-direction resolution becomes doubled, and sends the same as image data of 120 fps to the display unit 208.

The display unit 208 is composed of a liquid crystal display (LCD), an organic electro-luminescence (EL) panel, or the like, for example. The display unit 208 may be an external device connected to the reception device 200.

Operations of the reception device 200 illustrated in FIG. 17 will be described briefly. The reception unit 202 receives the transport stream TS on broadcast waves or in packets over a network from the transmission device 100. The transport stream TS is sent to the demultiplexer 203. The demultiplexer 203 retrieves selectively from the transport stream TS the encoded image data of pictures at the level commensurate with the capability of the decoder 205 based on the hierarchical information inserted in the layer of the container, and sends the sane to the compressed data buffer (cpb) 204 for temporary accumulation.

The decoder 205 retrieves the encoded image data of pictures at the respective levels accumulated in the compressed data buffer 204. The decoder 205 then decodes the retrieved encoded image data of the pictures at the respective decode timings for the pictures, sends the same to the decompressed data buffer (dpb) 206 for temporary accumulation.

Then, the image data of the pictures read sequentially at the display timings from the decompressed data buffer (dpb) 206 is sent to the post-processing unit 207. The post-processing unit 207 subjects the image data of the pictures to interpolation or sub sampling to match the frame rate with the display capability. The image data of the pictures processed by the post-processing unit 207 is supplied to the display unit 208 for display of moving images.

As described above, in the transmission/reception system 10 illustrated in FIG. 1, the transmission device 100 equalizes the hierarchical composition between the low-level side and the high-level side, and combines corresponding pictures on the low-level side and the high-level side into one set and encodes the same sequentially. Accordingly, the reception device 200 can decode the encoded image data of the pictures on the low-level side and the high-level side at one collective timing, thereby reducing the buffer size and decreasing decode delay.

In addition, in the transmission/reception system 10 illustrated in FIG. 1, the transmission device 100 inserts the hierarchical information into the layer of the container to gene rate a transport stream containing a video stream having the image data of the encoded pictures at the respective levels. Accordingly, the reception device 200 can refer to the hierarchical information to retrieve selectively from the video stream the encoded image data of the pictures up to the level commensurate with the capability of the decoder in an easy manner, for example.

In the transmission/reception system 10 illustrated in FIG. 1, the transmission device 100 inserts the hierarchical information into the PES extension field of the header of the PES packet in the posit ion synchronized with the encoded image data of the pictures of the video stream at least for each coded video sequence (CVS). This allows the reception side to, even with changes in the hierarchical composition, retrieve selectively from the video stream the encoded image data of the pictures up to the level commensurate with the capability of the decoder.

Figure 18:
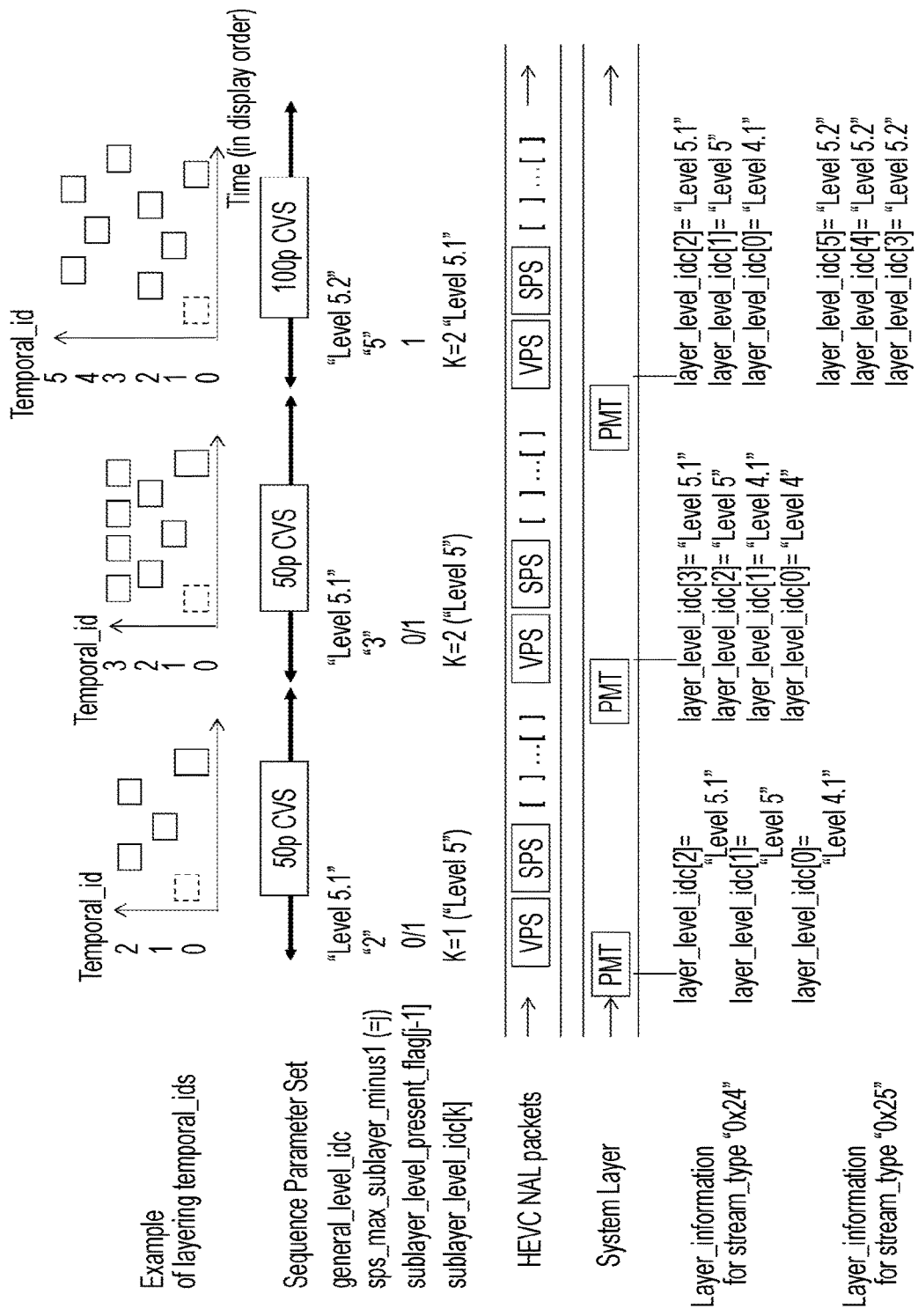
FIG. 18 is a diagram illustrating an example of correspondence between signaling of "level_idc" and hierarchical information of coded image data with changes in hierarchical composition.

FIG. 18 illustrates an example of correspondence between signaling of "level_idc" and hierarchical information of encoded image data with changes in hierarchical composition. In this example, the hierarchical composition changes from a first 50 P CVS system in which encoding is performed at three levels of 0 to 2 to a second 50 P CVS system in which encoding is performed at four levels of 0 to 3, and further changes to a 100 P CVS system in which encoding is performed at six levels of 0 to 5. In the illustrated example, the hierarchical information is inserted under the PMT. However, the foregoing matter also applies to the case where the hierarchical information is inserted under the EIT or into the PES extension field as described above.

In the period of the first 50 P CVS system, data is distributed in a single video stream. The value of "general_level_idc" inserted into the SPS of the encoded image data is set to "Level 5.1" as a level value containing all the pictures at the levels of 0 to 2. The value of "sublayer_level_idc[1]" as the level specified value of bit rate at the level of 1 is set to "Level 5." In this case, the hierarchical information is described as "layer_level_idc[0]"=Level 4.1, "layer_level_idc[1]"=Level 5, and "layer_level_idc[2]"=Level 5.1."

In the period of the second SOP CVS system, data is distributed in a single video stream. The value of "general_level_idc" inserted into the SPS of the encoded image data is set to "Level 5.1" as a level value containing all the pictures at the levels of 0 to 3. The value of "sublayer level_idc[2]" as the level specified value of bit rate at the level of 2 is set to "Level 5." In this case, the hierarchical information is described as "layer_level_idc[0]"=Level 4, "layer_level_idc[1]"=Level 4.1, "layer_level_idc[2]"=Level 5", and "layer_level_idc[3]"=Level 5.1."

In the period of the 100 P CVS system, data is distributed in two video streams. The value of "general_level_idc" inserted into the SPS of the encoded image data is set to "Level 5.2" as a level value containing all the pictures at the levels of 0 to 5. The value of "sublayer_level_idc[2]" as the level specified value of bit rate at the level of 2 is set to "Level 5.1." In this case, the hierarchical information is described as "layer_level_idc[0]"=Level 4.1, "layer_level_idc[1]"=Level 5, "layer_level_idc[2]"=Level 5.1, "layer_level_idc[3]"=Level 5.2, "layer_level_idc[4]"=Level 5.2, and "layer_level)idc[5]"=Level 5.2."

While the hierarchical composition changes as illustrated in the drawing, if the decoder 205 of the reception device 200 corresponds to 50 P, for example, the demultiplexer 203 retrieves the levels of 0 to 2 in the period of the first 50 P CVS system, retrieves the levels of 0 to 3 in the second 50 P CVS system, and retrieves the levels of 0 to 2 in the period of the 100 P CVS system, based on the hierarchical information, and sends the same to the compressed data buffer 204. The decoder 205 decodes the encoded image data of the pictures at their respective decode timings to obtain 50 P image data.

<2. Modification Example>

In the foregoing embodiment, the transmission/reception system 10 is composed of the transmission device 100 and the reception device 200. However, the configuration of the transmission/reception system to which the subject technique is applicable is not limited to this. For example, part of the reception device 200 may be formed as a set-top box and a monitor connected via a digital interface such as a high-definition multimedia interface (HDMI). The "HDMI" is a registered trademark.

In the foregoing embodiment, the container is a transport stream (MPEG-2 TS). However, the subject technique is also applicable to other systems in which data is distributed to reception terminals via a network such as the Internet. In the Internet delivery, data is frequently distributed by a container in MP4 or ocher formats. That is, the container may be a transport stream (MPEG-2 TS) employed under digital broadcasting standards, or any other container in various formats such as MP4 used in the Internet delivery.

The subject technique may be configured as described below.

(1) A transmission device including:

an image encoding unit that classifies image data of pictures constituting moving image data into a plurality of levels and encodes the classified image data of the pictures at the respective levels to generate a video stream having the encoded image data of the pictures at the respective levels; and a transmission unit that transmits a container in a predetermined format containing the generated video stream, wherein the image encoding unit equalizes hierarchical composition between a low-level side and a high-level side, and combines corresponding pictures on the low-level side and the high-level side into one set and encodes the same sequentially.

(2) The transmission device according to (1), further including a hierarchical information insertion unit that inserts hierarchical information into a layer of the container.

(3) The transmission device according to (2), wherein the hierarchical information has information on level specified values for the respective levels.

(4) The transmission device according to (2) or (3), wherein the hierarchical information Insertion unit inserts the hierarchical information into the layer of the container at positions in synchronization with the encoded image data of the pictures in the video stream.

(5) The transmission device according to (4), wherein the hierarchical information insert ion unit inserts the hierarchical information into an extension field of a PES packet.

(6) The transmission device according to (5), wherein the hierarchical information insert ion unit inserts the hierarchical information into the extension field of the PES packet at least for each coded video sequence.

(7) The transmission device according to (5) or (6), further including an information insertion unit that inserts information for describing explicitly whether the hierarchical information is inserted into the extension field of the PES packet under a program map table.

(8) The transmission device according to (2) or (3), wherein the hierarchical information insertion unit inserts the hierarchical information under a program map table.

(9) The transmission device according to (2) or (3), wherein the hierarchical information insert ion unit inserts the hierarchical information under an event information table.

(10) The transmission device according to any of (1) to (9), wherein the image encoding unit generates a single video stream having the encoded image data of the pictures at the respective levels or divides the plurality of levels into two sets of the upper-level side and the lower-level side and generates two video streams having the encoded image data of the pictures in the respective level sets.

(11) A transmission method including:

an image encoding step of classifying image data of pictures constituting moving image data into a plurality of levels and encoding the classified image data of the pictures at the respective levels to generate a video stream having the encoded image data of the pictures at the respective levels; and a transmission step by a transmission unit of transmitting a container in a predetermined format containing the generated video stream, wherein at the image encoding step, hierarchical composition is equalized between a low-level side and a high-level side, and corresponding pictures on the low-level side and the high-level side are combined into one set and are sequentially encoded.

(12) A reception device including a reception unit that receives a container in a predetermined format that contains a video stream having encoded image data of pictures obtained by classifying image data of the pictures constituting moving image data into a plurality of levels and encoding the same, wherein in the encoding, hierarchical composition is equalized between a low-level side and a high-level side, and corresponding pictures on the low-level side and the high-level side are combined into one set and are sequentially encoded, and the reception device further includes a processing unit that processes the received container.

(13) The reception device according to (12), wherein hierarchical information is inserted into a layer of the container, and the processing unit retrieves selectively from the video stream the encoded image data of the pictures at a predetermined level and lower ones and decodes the same, based on the hierarchical information, to obtain the image data of the pictures at the predetermined level and lower ones.

(14) A reception method including a reception step by a reception unit of receiving a container in a predetermined format containing a video stream that has encoded image data of pictures at a plurality of levels obtained by classifying image data of the pictures constituting moving image data into the respective levels and encoding the same, in the encoding, hierarchical composition is equalized between a low-level side and a high-level side, and corresponding pictures on the low-level side and the high-level side are combined into one set and are sequentially encoded, and the reception method further includes a processing step of processing the received container.

INDUSTRIAL APPLICABILITY

A main feature of the subject technique is in that the hierarchical composition is equalized between the low-level side and the high-level side, and corresponding pictures on the low-level side and the high-level side are combined into one set and are sequentially encoded, thereby allowing the reception side to decode the encoded image data of the pictures on the low-level side and the high-level side with a smaller buffer size and a reduced decoding delay (see FIGS. 3 and 5). Another main feature of the subject technique is in that the hierarchical information is inserted into the layer of the container to allow the reception side to retrieve selectively from the video stream the encoded image data of the pictures up to the level commensurate with the capability of the decoder in an easy manner (see FIGS. 7A and 7B, and FIGS. 11 to 16).

REFERENCE SIGNS LIST

10 Transmission/reception system
100 Transmission device
101 CPU
102 Encoder
103 Compressed data buffer (cpb)
104 Multiplexer
105 Transmission unit
200 Reception device
201 CPU
202 Reception unit
203 Demultiplexer
204 Compressed data buffer (cpb)
205 Decoder
206 Decompressed data buffer (dpb)
207 Post-processing unit
208 Display unit

The invention claimed is:
1. A reception device comprising:
circuitry configured to
receive a container including
a video stream having encoded image data on a low-level side and a high-level side generated by performing hierarchical encoding on image data of pictures constituting moving image data, and a table describing one or more video streams included in the container, the table including hierarchical information including a level specified value of the encoded image data on the low-level side and a level specified value of the video stream, wherein the level specified value of the encoded image data on the low-level side and the level specified value of the video stream are inserted into a layer of the video stream;

decode the encoded image data on the low-level side or the encoded image data on both the low-level side and the high-level side included in the received container to obtain the image data of the pictures constituting the moving image data; and subject the obtained image data, in response to a determination that the obtained image data corresponds to a frame rate smaller than a frame rate corresponding to a display capability, to interpolation to increase the frame rate of the obtained image data.

2. The reception device according to claim 1, wherein the circuitry is configured to decode the encoded image data on the low-level side or the encoded image data on both the low-level side and the high-level side included in the received container depending on a decoding capability to obtain the image data of the pictures constituting the moving image data.

3. The reception device according to claim 2, wherein the circuitry is configured to retrieve the encoded image data on the low-level side or the encoded image data on both the low-level side and the high-level side from the video stream depending on the decoding capability based on the hierarchical information.

4. The reception device according to claim 1, wherein the circuitry is configured to match the frame rate of the obtained image data with the display capability.

5. The reception device according to claim 1, wherein the circuitry is configured to subject the obtained image data, in response to a determination that the obtained image data corresponds to a frame rate larger than the frame rate corresponding to the display capability, to sub sampling to decrease the frame rate of the obtained image data.

6. The reception device according to claim 1, wherein the container is in MPEG-4 Part 14 (MP4) format.

7. The reception device according to claim 1, wherein the circuitry is configured to display the obtained image data in the increased frame rate.

8. The reception device according to claim 7, further comprising a display configured to display the obtained image data.

9. The reception device according to claim 8, wherein the display is a liquid crystal display (LCD) or an organic electro-luminescence (EL) display.

10. The reception device according to claim 1, wherein the circuitry is configured to output the obtained image data to an external device to display in the increased frame rate.

11. A reception method comprising:
receiving a container including
a video stream having encoded image data on a low-level side and a high-level side generated by performing hierarchical encoding on image data of pictures constituting moving image data, and
a table describing one or more video streams included in the container, the table including hierarchical information including a level specified value of the encoded image data on the low-level side and a level specified value of the video stream, wherein
the level specified value of the encoded image data on the low-level side and the level specified value of the video stream are inserted into a layer of the video stream;
decoding the encoded image data on the low-level side or the encoded image data on both the low-level side and the high-level side included in the received container to obtain the image data of the pictures constituting the moving image data; and
subjecting the obtained image data, in response to a determination that the obtained image data corresponds to a frame rate smaller than a frame rate corresponding to a display capability, to interpolation to increase the frame rate of the obtained image data.

12. The reception method according to claim 11, wherein the decoding the encoded image data on the low-level side or the encoded image data on both the low-level side and the high-level side included in the received container is performed depending on a decoding capability to obtain the image data of the pictures constituting the moving image data.

13. The reception method according to claim 12, wherein the method further comprises retrieving the encoded image data on the low-level side or the encoded image data on both the low-level side and the high-level side from the video stream depending on the decoding capability based on the hierarchical information.

14. The reception method according to claim 11, wherein the method further comprises matching the frame rate of the obtained image data with the display capability.

15. The reception method according to claim 11, wherein the method further comprises subjecting the obtained image data, in response to a determination that the obtained image data corresponds to a frame rate larger than the frame rate corresponding to the display capability, to sub sampling to decrease the frame rate of the obtained image data.

16. The reception method according to claim 11, wherein the container is in MPEG-4 Part 14 (MP4) format.

17. The reception method according to claim 11, wherein the method further comprises displaying the obtained image data in the increased frame rate.

18. The reception method according to claim 17, wherein the method further comprises outputting the obtained image data to an external device to display in the increased frame rate.

* * * * *